United States Patent Office 2,804,011
Patented Aug. 27, 1957

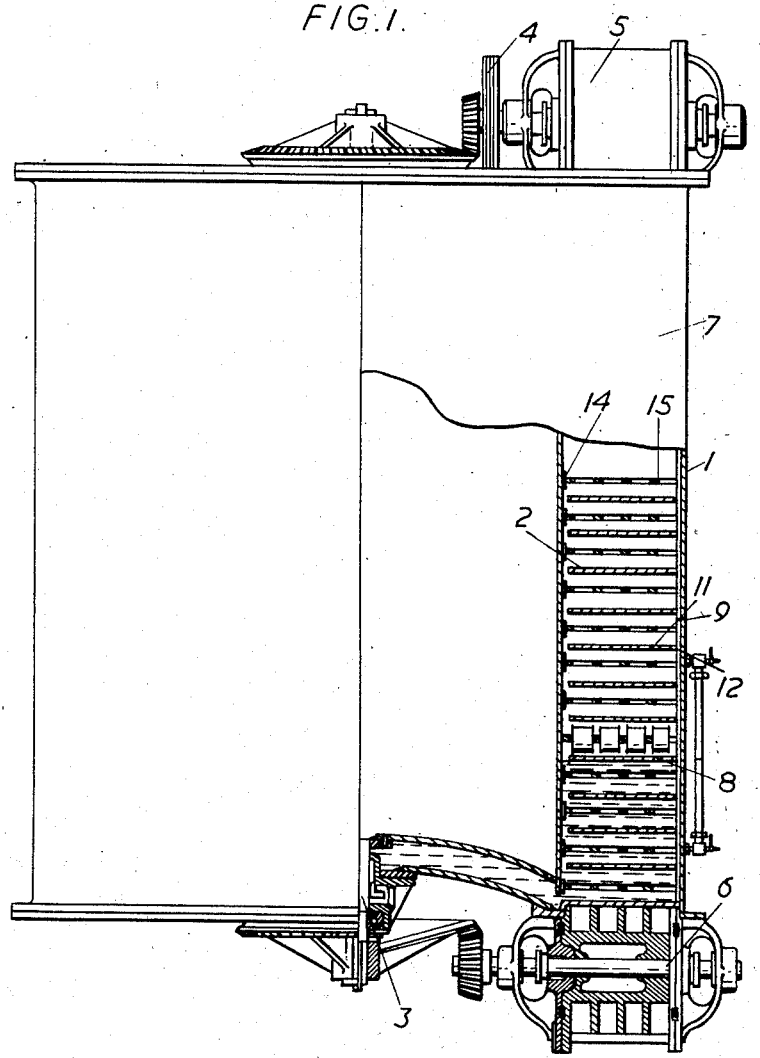

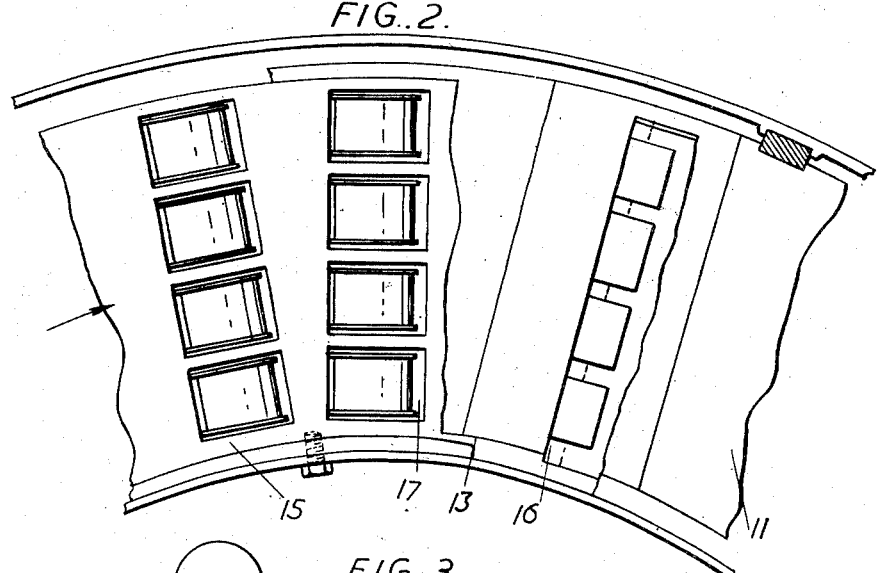
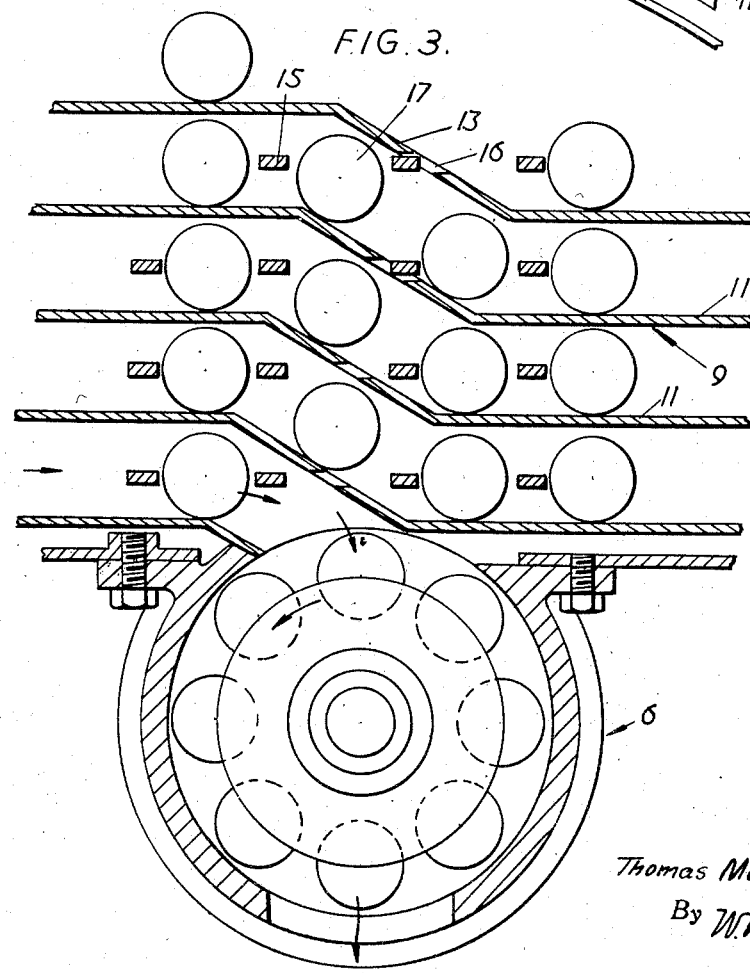

2,804,011

CONVEYING AND AGITATING MECHANISMS

Thomas M. Jones, Hove, England

Application February 6, 1956, Serial No. 563,743

5 Claims. (Cl. 99—365)

This invention relates to conveying and agitating mechanisms and particularly to such mechanisms for cylindrical bodies such as cans. The invention finds particular application in vertical rotary sterilizers and agitators for canned food products which require agitation during sterilization.

It is an object of the invention to provide a mechanism which will agitate the can throughout its transit, and which has a greater capacity and is of lower cost than conventional mechanisms for sterilizers of this kind. It is a further object of the invention to provide a steriliser in which cans may be passed from the sterilising zone into a cooling zone without the necessity of transfer valves.

According to the invention there is provided a conveying and agitating mechanism for cylindrical bodies such as cans which comprises a plurality of flat horizontal circular plates each radially apertured and joined at the radial apertures to the axially adjacent plates by parallel inclined plates thereby to form a generally helical path of substantially uniform depth between said plates, and a plurality of circular members co-axially disposed relative to said plates and axially interleaved therewith, said parallel inclined plates being apertured to permit relative rotation of said plates and members and said members being apertured to horizontally restrain said cylindrical bodies, whereby relative rotation between said plates and members cause said cylindrical bodies to roll upon said plates to move through said generally helical path.

The invention further provides a vertical rotary steriliser and agitator including a mechanism as set out above and such a steriliser may essentially comprise such a mechanism within a vertical cylindrical casing, means to feed cans to said mechanism at the upper end of the casing, and means to remove sterilised cans therefrom at the lower end thereof; the upper part of said casing being maintained full of steam under pressure to form a sterilising zone and the lower part of the casing containing water to cool the cans before discharge.

In order that the invention may be clearly understood some embodiments thereof will now be described, by way of example, with reference to the accompanying diagrammatic drawings in which:

Fig. 1 is a partly sectioned elevation of a steriliser according to the invention, Fig. 2 is a detail in plan, and, Fig. 3 is a detail in elevation showing the construction and working of the conveyor.

In Fig. 1 a steriliser agitator and cooler is shown comprising a cylindrical casing 1 having an inner drum 2 rotatable on a shaft 3 by means of a drive 4. A feed device 5 feeds cans into the apparatus whilst minimising steam leakage and a similar device 6 at the bottom of the cylinder removes the cans after sterilisation and cooling with a minimum water leakage. The upper part of the cylinder 7 is maintained full of steam under pressure to provide a sterilising zone whilst that part of the cylinder below the level 8 is maintained filled with cooling water to cool the cans before discharge. Suitable means are provided for maintaining the water and steam at the correct levels and temperatures in the cylinder. Advantageously cooling means for the water are provided immediately adjacent the bottom of the cylinder or cold water is introduced at this level to provide a maximum cooling of the cans immediately before discharge from the cylinder. Such a measure is made more effective since the conveyor mechanism does not promote or allow a great deal of liquid intermixing or circulation.

The cans are carried through the cylinder in a helical path by the conveyor and agitator which is shown in greater detail in Figs. 2 and 3. A stator 9 is made up of a number of horizontal annular plates 11 supported upon a framework 12 and extending between the cylinder 1 and the drum 2. A parallel sided radial slot is formed at corresponding points in each of the plates and parallel inclined plates 13 extend between adjacent plates at this point. By this means the stator provides a generally helical path upon which the cans may be rolled from the top of the cylinder to the bottom.

The continuous rolling of the cans serves to agitate their content throughout their passage.

A rotor 14 integral with the drum 2 serves to move the cans through the helical path to the stator at a required rate and in co-ordination with the feed and discharge rate. The rotor is made up of annular members or plates 15 axially interleaved with the stator plates 11 and disposed substantially equidistant therebetween. To allow these to rotate relative to the stator the inclined plates 13 are apertured at 16. Each of the rotor plates 15 are apertured at 17 to accommodate a particular size of can to restrain it from movement from its intended path, without restricting its rotation. Rotation of the rotor relative to the stator thereby causes the cans to move in a controlled manner through the helical path in the stator. They are thereby passed through the sterilizing zone and subsequently through the cooling water whilst being constantly turned and agitated. The speed of rotor rotation serves to determine the time of treatment.

In the illustrated embodiment the apertures 17 in the rotor plates are made of a size to accommodate a particular can. If desired however these apertures may extend over the full available radial width of the plates to accommodate several cans, adjustable spacers being provided if desired, to divide the apertures to a size for individual cans. Alternatively the rotor plates may be replaced by radial bars in which case the outside ends of these are desirably connected together by a peripheral bar or plate to prevent outward displacement or jamming of cans.

The conveying and agitating mechanism may conveniently be made easily removable from the cylindrical casing for cleaning overhaul or adjustment. Such an arrangement is particularly convenient and allows the steam and water supplies, stuffing boxes and driving mechanism all to be embodied in the structure of the cylindrical casing.

It will be apparent that the apparatus may be made in any desired size and that many purely mechanical variations may be made as convenient. For example the rotor and stator functions may be reversed or both may move in opposite directions. Also whilst a sterilizer cooler has been described in which no transfer valves are used these may be incorporated or a mechanism using them may be constructed if so desired.

What I claim is:

1. In a conveying and agitating mechanism for cylindrical bodies such as cans, mechanism defining a general helical path and comprising a plurality of flat horizontal circular plates each radially apertured and joined at the radial apertures to the axially adjacent plates by parallel inclined plates thereby to form a generally helical path of substantially uniform depth between said plates, a plurality of circular members co-axially disposed relative to said plates and axially interleaved therewith, said parallel inclined plates being apertured to permit relative rotation of said plates and members and said members being apertured to horizontally restrain said cylindrical bodies, whereby relative rotation between said plates and said members cause said cylindrical bodies to roll upon said plates to move through said generally helical path.

2. A mechanism as claimed in claim 1 in which said plates are mounted in a framework to form a stator whilst said members are carried upon an axial member to form a rotor.

3. A mechanism as claimed in claim 1 in which said members are flat circular plates apertured to accommodate said cylindrical bodies, said apertures being so formed that the axes of said cylindrical bodies lie substantially radially of said member and being of such a size that said cylindrical bodies are free to rotate about their axes.

4. A mechanism as claimed in claim 1 in which said members comprise a number of radial bars the outer ends of which are joined by a peripheral member.

5. In a vertical rotary steriliser and agitator for canned products having a vertical cylindrical casing; a conveying and agitating mechanism including a plurality of flat horizontal circular plates each radially apertured and joined at the radial apertures to the axially adjacent plates by parallel inclined plates thereby to form a generally helical path of substantially uniform depth between said plates, a plurality of circular members co-axially disposed relative to said plates and axially interleaved therewith, said parallel inclined plates being apertured to permit relative rotation of said plates and members and said members being apertured to horizontally restrain said cans whereby relative rotation between said plates and said members cause said cans to roll upon said plates to move through said generally helical path; means in the upper end of said casing to feed cans to said mechanism, and means to remove sterilised cans therefrom at the lower end thereof; the upper part of said casing being maintained full of steam under pressure to form a sterilising zone and the lower part of the casing containing water to cool the cans before discharge.

References Cited in the file of this patent

UNITED STATES PATENTS 1,006,162    Winters ---------------- Oct. 17, 1911